US011252486B2

(12) United States Patent
Vogt et al.

(10) Patent No.: US 11,252,486 B2
(45) Date of Patent: Feb. 15, 2022

(54) WIRELESS MONITORING AND PROFILING OF REACTOR CONDITIONS USING ARRAYS OF SENSOR-ENABLED RFID TAGS PLACED AT KNOWN REACTOR HEIGHTS

(71) Applicant: SHELL OIL COMPANY, Houston, TX (US)

(72) Inventors: Kaspar Joseph Vogt, Houston, TX (US); David Winn Fuchs, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/960,741

(22) PCT Filed: Jan. 9, 2019

(86) PCT No.: PCT/US2019/012876
§ 371 (c)(1),
(2) Date: Jul. 8, 2020

(87) PCT Pub. No.: WO2019/139968
PCT Pub. Date: Jul. 18, 2019

(65) Prior Publication Data
US 2020/0404400 A1 Dec. 24, 2020

Related U.S. Application Data

(60) Provisional application No. 62/616,185, filed on Jan. 11, 2018.

(51) Int. Cl.
H04Q 9/00 (2006.01)
G01D 21/02 (2006.01)
G06K 7/10 (2006.01)

(52) U.S. Cl.
CPC ............... *H04Q 9/00* (2013.01); *G01D 21/02* (2013.01); *G06K 7/10316* (2013.01); *G06K 7/10366* (2013.01); *H04Q 2209/47* (2013.01)

(58) Field of Classification Search
CPC ...... H04Q 9/00; H04Q 2209/47; G01D 21/02; G01D 21/00; B01J 8/025;
(Continued)

(56) References Cited

U.S. PATENT DOCUMENTS 7,397,370 B2 7/2008 Bratkovski
7,846,397 B2 * 12/2010 Gregg ................ G01K 1/024
422/105

(Continued)

FOREIGN PATENT DOCUMENTS

WO 2003098175 A1 11/2003
WO 2012104230 A1 8/2012
(Continued)

OTHER PUBLICATIONS

International Search Report and Written Opinion received for PCT Patent Application No. PCT/US2019/012876, dated Apr. 11, 2019, 10 pages.

*Primary Examiner* — Brian Wilson
(74) *Attorney, Agent, or Firm* — Shell Oil Company

(57) ABSTRACT

Disclosed is a system and method for wirelessly monitoring process conditions within a reactor vessel. An array of sensor-enabled radio frequency identification (RFID) tags is placed at known heights within a catalyst bed of a vessel and are used to measure 10 various conditions within the vessel. The sensor-enabled RFID tags are encoded with individual identification codes and are wirelessly linked to multiple transceivers. The use of multiple transceivers allows for the application of triangulation methods to identify the location of each of the sensor-enabled RFID tags in three-dimensional space and for the interrogation of each sensor-enabled (Continued)

RFID tag to receive responsive transponder signals that carry information representative of the sensed condition within the reactor.

16 Claims, 3 Drawing Sheets

(58) Field of Classification Search
CPC .... B01J 2208/00061; B01J 2208/00539; B01J 2208/00548; B01J 2208/00584; B01J 2208/00592; B01J 2208/00628; B01J 2208/00734; G06K 19/0723; G06K 19/0717; G06K 19/0775; G06K 19/0715; G06K 19/0725; G06K 7/10316; H01Q 1/2225; H01Q 9/42; G08B 21/20; G01N 2291/02845
See application file for complete search history.

(56) References Cited

U.S. PATENT DOCUMENTS

| | | |
|---|---|---|
| 8,106,778 B2 | 1/2012 | Killian et al. |
| 8,658,024 B2 * | 2/2014 | Long .................. B01J 29/46 208/120.35 |
| 9,035,766 B2 | 5/2015 | Worthington et al. |
| 9,317,795 B2 | 4/2016 | Forster |
| 9,412,061 B2 | 8/2016 | Forster |
| 9,563,833 B2 | 2/2017 | Swager et al. |
| 2004/0233043 A1 * | 11/2004 | Yazawa ............ G06K 19/0717 340/10.3 |
| 2007/0215709 A1 | 9/2007 | Baude et al. |
| 2009/0231127 A1 * | 9/2009 | Angell ................ G06K 7/0008 340/539.22 |
| 2013/0057390 A1 | 3/2013 | Watt et al. |
| 2013/0284812 A1 * | 10/2013 | Cok ................ G06K 19/07749 235/492 |
| 2014/0294041 A1 | 10/2014 | Zhang et al. |
| 2015/0268079 A1 * | 9/2015 | Lund .................... G01F 1/704 235/375 |

FOREIGN PATENT DOCUMENTS

| | | |
|---|---|---|
| WO | 2014062066 A1 | 4/2014 |
| WO | 2019139946 A1 | 7/2019 |
| WO | 2019139953 A1 | 7/2019 |
| WO | 2019139974 A1 | 7/2019 |

* cited by examiner

WIRELESS MONITORING AND PROFILING OF REACTOR CONDITIONS USING ARRAYS OF SENSOR-ENABLED RFID TAGS PLACED AT KNOWN REACTOR HEIGHTS

CROSS REFERENCE TO RELATED APPLICATIONS

This is a national stage application of International application No. PCT/US2019/012876, filed 9 Jan. 2019, which claims priority of U.S. Provisional Application No. 62/616,185, filed 11 Jan. 2018.

CROSS REFERENCE TO RELATED APPLICATIONS

The present application claims the benefit of U.S. Provisional Patent Application Ser. No. 62/616,185, filed on 11 Jan. 2018, the entire disclosure of which is hereby incorporated by reference.

FIELD OF THE INVENTION

This invention relates to a system and method for wirelessly monitoring and three-dimensional profiling of conditions within a process vessel such as a reactor.

BACKGROUND

Reactor vessels containing catalyst are common to refineries and chemical plants. In operating these reactors, it is desirable to measure or monitor the process conditions inside the vessel because this information can help in controlling the reaction conditions within the reactor vessel. Current methods for measuring the conditions inside a reactor vessel require having a physical connection, such as an electrical or pneumatic connection, to the sensor that transmits sensor-measured information for external display. One example of such measurement means is the use of thermocouples to measure temperature. In order to use a thermocouple to measure the temperature at a location within a reactor vessel, a thermowell is necessary. The thermowell is installed through the vessel wall, and it extends to a location at which temperature is measured within the vessel.

It is desirable to have the ability to measure and observe process conditions at locations within a reactor vessel and to wirelessly transmit the information for collection and processing at a remote location. It further is desirable to be able to provide a three-dimensional profile of conditions throughout the volume of a reaction zone defined by a vessel. We have proposed using sensor-enabled radio frequency identification (RFID) tags for measuring several of the conditions within a reactor volume, such as pressure, temperature, fluid composition, vapor and liquid composition, pH, and flow rate, and wirelessly transmitting the measured information for remote collection and processing.

An example of a sensor-enabled RFID tag used to measure environmental conditions is described in U.S. Pat. No. 7,397,370. This patent presents a system that provides for monitoring an environment using a plurality of radio frequency identification ("RFID") assemblies. The system may include an RFID tag, having an associated unique identification ("ID") code, configured with a sensor for sensing information regarding the environment, and an antenna for wirelessly transmitting the sensed information to a processing system. The transmitted information received by the processing system includes the sensed environmental information along with the associated identification code and is processed to provide for monitoring an environment and changes in the monitored environment.

Another reference that describes the use of sensor-enabled RFID tags for measuring and tracking variable environmental conditions is U.S. Pat. No. 8,106,778. This patent discloses a method and system capable of tracking variable conditions using radio frequency identification (RFID). An RFID sensor tag is used to measure a variable condition, such as location, temperature, pressure, and humidity. In response to an interrogation signal transmitted by an RFID reader device, the RFID sensor tag transmits a signal that includes associated tag identification data with the variable data representing the measured condition. The response signal includes both variable data and non-variable data so that the measured conditions can be associated with the tag identification data. The RFID reader device may also receive a plurality of response signals each from one of a plurality of RFID tags. In this case, at least one of the plurality of response signals can include variable data representing a measured condition at the respective one of the plurality of RFID tags and tag identification data of the respective one of the plurality of RFID tags.

Patent Publication US 2007/0215709 discloses an RFID-based sensor that includes RFID circuitry combined with a sensor. The sensor element is configured to change conductivity state based on its exposure to a physical condition of the ambient surroundings to which the sensor is exposed. These physical conditions may include the presence or absence of gas, light, sound, temperature, pressure, moisture, and/or other conditions of the environment. In response to an RF signal transmitted by an RFID interrogator, the RFID-based sensor transmits for receipt by the RFID interrogator an identification (ID) code and other information associated with present or prior exposure of the RFID-based sensor to one or more physical conditions. The RFID-based sensor may also be powered by the RF energy delivered by the RFID interrogator.

U.S. Pat. No. 9,317,795 discloses an RFID sensing system that includes an array of sensing elements disposed on a surface. Each sensing element includes an RFID microchip, an antenna operatively coupled to the microchip, and a pressure-sensitive material disposed on the antenna. An RFID reader system provides an interrogation signal to each sensing element that transmits a signal back to the RFID reader via the coupled antenna when the pressure-sensitive material of a sensing element of the mat is compressed.

These publications do not disclose or suggest anything about using sensor-enabled RFID tags to measure process or environmental conditions within a reactor vessel or to wirelessly transfer information related to measured conditions within a reactor vessel for further receipt, processing and use. The publications further fail to disclose or teach anything about providing for wireless monitoring of conditions within a reactor vessel or profiling of the physical conditions within a reaction zone defined by a reactor vessel.

We, however, have invented a system and method that provide for local sensing or measurement of environmental or process conditions at specific heights or levels within a reactor using sensor-enabled RFID tags. Specific tag identification information and information representative of the measured condition within the reactor are carried on RF waves that are wirelessly transmitted by sensor-enabled RFID tags to one or more transceivers. This allows for profiling of conditions within the reaction zone.

SUMMARY

Accordingly, provided is a system for wirelessly monitoring and profiling process conditions within a reactor vessel. The reactor vessel of the system defines a reaction zone, which includes a catalyst bed having a height of catalyst particles, within which is an array of sensor-enabled RFID tags placed at a known height within the catalyst bed. Included are transceivers that include a first RFID transceiver antenna and a second RFID transceiver antenna. The first RFID transceiver antenna is wirelessly linked to each sensor-enabled RFID tag of the array and is capable of transmitting a first interrogation signal and receiving a first RFID transponder signal that is transmitted responsive to the first interrogation signal. The second RFID transceiver antenna is wirelessly linked to each sensor-enabled RFID tag of the array and is capable of transmitting a second interrogation signal and receiving a second RFID transponder signal that is transmitted responsive to the second interrogation signal. Each sensor-enabled RFID tag of the array is encoded with a unique non-variable identification code and is capable of sensing a reactor condition within the reaction zone, receiving interrogation signals from the transceivers, and, responsive to the interrogation signals, transmitting the RFID transponder signals. The RFID transponder signals include information representative of the unique non-variable identification codes and of one or more reactor conditions associated with each of the sensor-enabled RFID tags. The system provides for determining reactor conditions at the known heights within the catalyst bed and profiling of process conditions within the reaction zone.

Also provided is a method for wirelessly monitoring and profiling process conditions within a reactor vessel. This reactor vessel defines a reaction zone, which includes a catalyst bed having a height of catalyst particles, within which is an array of sensor-enabled RFID tags placed at known heights within the catalyst bed. The method includes transmitting interrogation signals by at least two RFID transceiver antennas. The interrogation signals are received by each sensor-enabled RFID tag of the array. In response to the interrogation signals, each sensor-enabled RFID tag transmits its associated RFID transponder signal that includes information representing a unique non-variable identification code and a surrounding condition that is associated with the sensor-enabled RFID tag. The RFID transceiver antennas receive the associated RFID transponder signals that are processed to provide a profile of the process conditions within the reaction zone.

BRIEF DESCRIPTION OF THE DRAWINGS

FIG. 3 illustrates a single array of sensor-enabled RFID tags placed at a known height within a catalyst bed and at least two RFID reader/interrogators that are wirelessly linked to the sensor-enabled RFID tags of the array. The RFID reader/interrogators are connected to a computer system for processing the information contained in the received RF signals transmitted by the sensor-enabled RFID tags.

DETAILED DESCRIPTION

Figure 1:
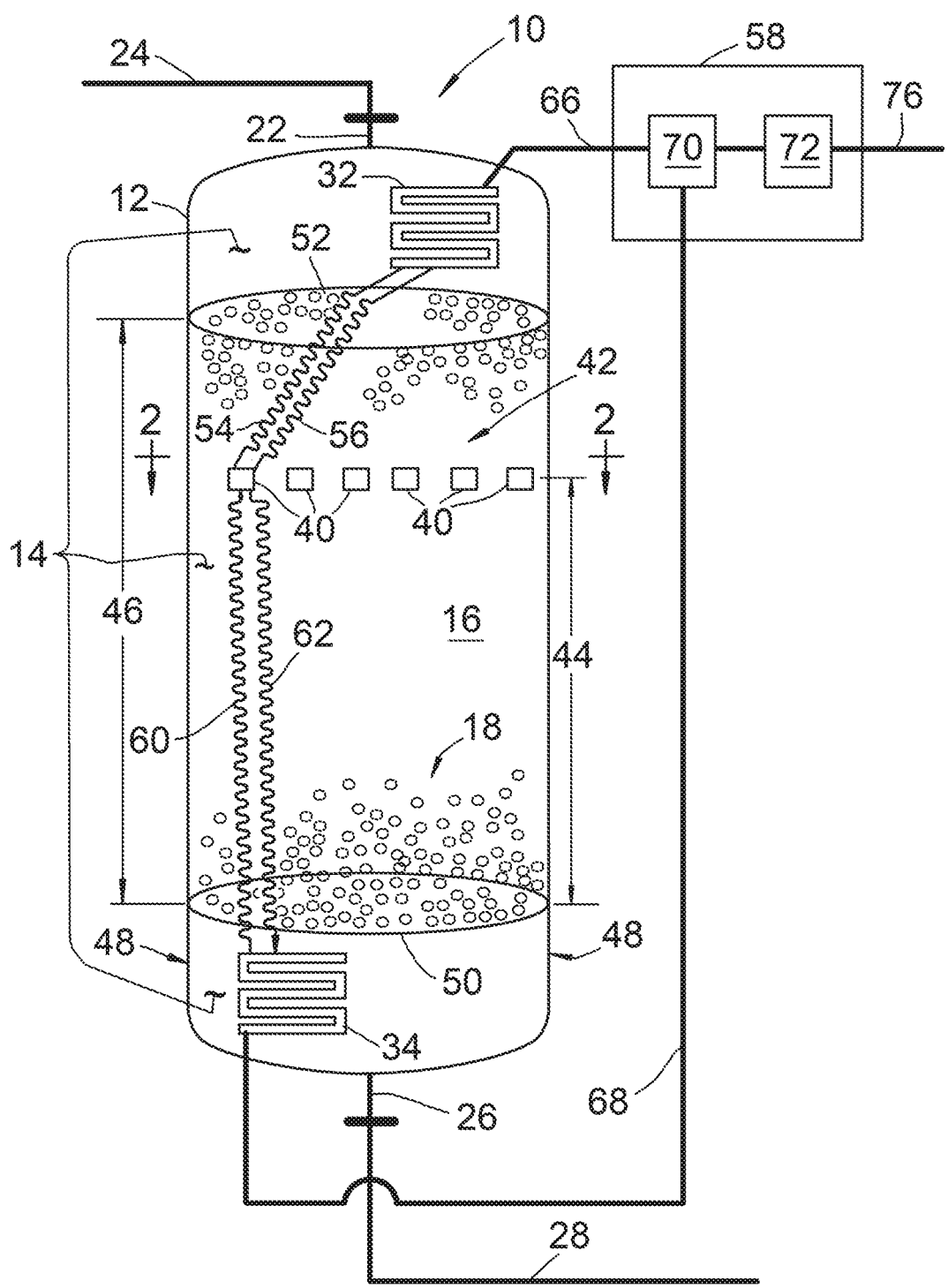
FIG. 1 is a schematic that represents an embodiment of the inventive system for wirelessly monitoring and three-dimensional profiling of conditions within the reaction zone of a reactor vessel.

Embodiments of the invention include both a system and method for wirelessly monitoring conditions within a reactor vessel and for providing profiles of conditions at locations within the reactor zone defined by the reactor vessel.

Filed concurrently with this patent application are the three related provisional patent applications entitled, "SP2118-Wireless Monitoring and Profiling of Reactor Conditions Using Plurality of Sensor-Enabled RFID Tags Having Known Locations," "SP2066-Wireless Reactor Monitoring System Using Passive Sensor Enabled RFID Tag," and SP2102-Wireless Monitoring and Profiling of Reactor Conditions Using Plurality of Sensor-Enabled RFID Tags and Multiple Transceivers," respectively having Ser. Nos. 62/616,148; 62/616,166; and 62/616,155.

Measured conditions within the reactor vessel can include process or environmental conditions, such as, the pressures or temperatures at various locations within a reactor vessel. The measured conditions may further include other parameters such as vapor and liquid percentages, flow rates, pH, and chemical compositions of fluids contained within or passing through the reactor vessel.

The invention provides for remotely measuring conditions within a reactor using arrays of sensor-enabled RFID tags placed at known heights within the catalyst bed of a reactor. The sensor-enabled RFID tags wirelessly transmit measured information regarding sensed conditions within the reactor by radio wave transmission in response to interrogation signals transmitted by the several transceivers of the system.

A processing system is used to process the signals transmitted by the sensor-enabled RFID tags. The processing system includes means, such as a computer with associated program code, for processing the information contained in the signals transmitted by the sensor-enabled RFID tags of the arrays to provide profiles of the conditions within the reactor vessel. The system does this with transceivers and the plurality of sensor-enabled RFID tags with each sensor-enabled RFID tag of the array providing means for measuring or sensing one or more environmental conditions existing at locations and heights within the reaction zone and catalyst bed of a reactor vessel.

In this specification, each sensor-enabled RFID tag of an array is a device that includes a sensor configured with or operatively connected to a passive RFID tag. The sensor provides means for sensing an environmental or process condition or parameter within the reactor vessel and means for providing a signal input, which contains information representative of the particularly measured condition or parameter, to the connected RFID tag. Passive RFID tags taught in the art include an integrated circuit coupled with a transponder antenna for receiving an interrogation signal from an RFID reader antenna (transceiver) and for transmitting a transponder signal in response to receiving the interrogation signal.

Since the sensor-enabled RFID tags are passive, each transmits an RFID transponder signal in response to receiving the interrogation signals transmitted by the RFID reader antennas of the system. As noted above, each sensor is integrated with an RFID tag and is capable of sensing one or more conditions within the reaction zone.

The sensor component of the sensor-enabled RFID tags is selected from a group of any suitable sensor known to those skilled in the art. Examples of the environmental conditions or parameters sensed or measured by the sensors include pressure, temperature, chemical composition, vapor and liquid composition, density, flow rate, pH, vibration, radiation, magnetic flux, light intensity, and sound intensity. Preferred sensor elements include those selected from the group consisting of temperature sensors, pressure sensors, chemical sensors, humidity sensors, pH sensors, flow sensors, liquid/vapor sensors and any combination thereof.

Each integrated sensor and RFID tag, i.e., the sensor-enabled RFID tag, provides means for sensing a reactor condition, receiving an interrogation signal, and, responsive to the interrogation signal, transmitting an RFID transponder signal containing information that is representative of the measured reactor condition. The patent publications US 2013/0057390; U.S. Pat. Nos. 9,563,833; 9,412,061; 9,035,766; and WO 03/098175 present examples of sensor-enabled RFID tags. We incorporate these patent publications herein by reference.

A necessary feature of the invention is for each of the sensor-enabled RFID tags of the array to be encoded with a unique, non-variable identification code. This is important, because in response to receiving the transceiver signals from each of the RFID transceivers, each sensor-enabled RFID tag transmits transponder signals containing unique tag identification data along with the variable data measured or sensed by the associated sensor. The transmission of the information representative of the unique non-variable tag identification code with the variable information representative of a reactor environmental condition measured or sensed by the RFID sensor provides for associating the transmitted variable information with a particular sensor.

One or more arrays of sensor-enabled RFID tags are placed at known heights within the catalyst bed of the reaction zone. An array of sensor-enabled RFID tags comprises multiple sensor-enabled RFID tags placed in a planar arrangement. The multiple of sensor-enabled RFID tags may be placed individually at the known catalyst bed height or they may be incorporated as a part of an array system that is placed at known heights within the catalyst bed. An example of such an array system includes multiple sensor-enabled RFID tags, such as two or more, that are affixed to or embodied within a material or fabric that is capable of being laid out in a plane at a known height within the catalyst bed.

In a preferred embodiment of the invention, numerous sensor-enabled RFID tags are placed in planes at known locations within the catalyst bed. The sensor-enabled RFID tags are placed individually or as a part of an array system of sensor-enabled RFID tags. Two or more transceivers are placed within or external to the reaction zone at locations so that they are wirelessly connected with the sensor-enabled RFID tags of the arrays. The transceivers are placed at known locations and distances from each other so that their interrogation signals can be used in combination with the transponder signals from the sensor-enabled RFID tags to obtain information concerning the distances and angular directions of the sensor-enabled RFID tags from the transceivers. The information relating to distances and angular directions should be such that a suitable triangulation method may be applied to determine the point locations of each sensor-enabled RFID tag in the three-dimensional space of the reaction zone.

The unique, non-variable identification code associated with each of the sensor-enabled RFID tags allows for identification of each sensor-enabled RFID tag with its point location in three-dimensional space that is determined by the application of the above-referenced triangulation method. Also, the use of the unique, non-variable identification code provides for connecting or associating each sensor-enabled RFID tag of an array with the reactor conditions sensed by it. Thus, each sensor-enabled RFID tag is capable of receiving an interrogation signal from each of the two or more transceivers, and, responsive to the interrogation signals, transmitting RFID transponder signals that include information representative of both the unique non-variable identification code and the measured reactor condition associated with the sensor-enabled RFID tag. This allows for associating a measured environmental condition with a point location at each of the known heights within the catalyst bed of the reactor.

The reactor vessel of the invention may be any suitable vessel made with any suitable material known to those skilled in the art. In many applications, the reactor vessel generally defines a volume that contains catalyst and into which is introduced reactants or feedstocks. In one embodiment of the invention, the reactor vessel defines a reaction zone within which is a catalyst bed comprising catalyst particles. The reaction zone may also include multiple beds of catalyst, including what are known as stacked beds. The reaction zone may be filled by any suitable arrangement of catalyst or catalyst beds, including being completely filled with catalyst particles or support particles, or both.

The reactor vessel may further be equipped with an inlet that provides fluid communication into the reaction zone and means for introducing a feed stream, such as hydrocarbons, into the reaction zone. The reactor vessel may also be equipped with an outlet that provides fluid communication from the reaction zone and means for removing an effluent stream, such as reaction products, from the reaction zone.

Any type of feed stream or fluid may be introduced into or contained within the reaction zone of the reactor vessel, including water, hydrocarbons, and other chemicals. Examples of hydrocarbons include naphtha, kerosene, diesel, gas oil, and heavy oil such as resid. Typically, the reaction zone contains one or more beds of catalyst particles along with any of the aforementioned fluids that preferably include any of the listed hydrocarbons.

The catalyst particles in the reaction zone may be of any size and shape typically used in industry, including extrudates of any shape (e.g., cylinders, dilobes, trilobes, and quadralobes), spheres, balls, irregular aggregates, pills and powders. The catalyst particle sizes can be in the range of from 0.1 mm to 200 mm, but, more typically, the size of the catalyst particles is in the range of from 0.5 mm to 100 mm, or from 1 mm to 20 mm, and they may have any composition.

Common catalyst compositions include an inorganic oxide component, such as, silica, alumina, silica-alumina, and titania. The catalyst composition further can comprise a catalytic metal component, such as any of the transition metals, including chromium, molybdenum, tungsten, rhenium, iron, cobalt, nickel, palladium, platinum, gold, silver, and copper. The concentration of the metal components of the catalyst particles may be upwardly to 60 wt. %, based on metal, regardless of its actual state, and, typically, the metal concentration is in the range of from 0.1 to 30 wt. %, based on metal, regardless of its actual state.

Each array of sensor-enabled RFID tags is placed at known height locations within the catalyst bed of the reaction zone so that each of the array of sensor-enabled RFID tags is surrounded by catalyst particles. For a typical reactor, the geometric dimensions of depth and width define the catalyst bed. For reactors that are definable by depth and width, a typical depth of the catalyst bed is in the range of from 0.5 to 20 meters, and a typical effective width of the catalyst bed is in the range of from 0.5 to 20 meters. Thus, each of the sensor-enabled RFID tags can be surrounded by a layer or envelop of catalyst particles having a thickness upwardly to 20 meters requiring the interrogation and transponder signals to pass through a bed thickness of catalyst particles of from about 0.5 to about 20 meters.

A preferred embodiment of the invention comprises at least two RFID transceiver antennas each of which is wirelessly linked to each sensor-enabled RFID tag of an array. The transceivers are placed at known locations and distances relative to each other. The information regarding placement of the transceivers and the height locations of the arrays of sensor-enabled RFID tag are used in application of the triangulation methods mentioned above. The distance and angular direction information relating to the placement of each sensor-enabled RFID tag of an array obtained by their interrogation using the transceivers is used as well in the application of the triangulation methodology to determine the specific locations of each sensor-enabled RFID tag of an array.

In the preferred embodiment, a first RFID transceiver antenna is placed at a known location that is remote to the sensor-enabled RFID tags within the catalyst bed of the reaction zone; provided, that, the first RFID transceiver antenna is wirelessly linked to or coupled with each of the sensor-enabled RFID tags of the array. The first RFID transceiver antenna is configured to allow for transmission of a first interrogator signal to each of the sensor-enabled RFID tags of the arrays and for receiving responsive first RFID transponder signals from each of the sensor-enabled RFID tags of the arrays.

The preferred embodiment of the inventive system further includes a second RFID transceiver antenna that is placed at a known location remote to the sensor-enabled RFID tags within the catalyst bed of the reaction zone; provided, that, the second RFID transceiver antenna is wirelessly linked to or coupled with each of the sensor-enabled RFID tags of the arrays. The second RFID transceiver antenna is configured to allow for transmission of a second interrogator signal to each of the sensor-enabled RFID tags of the arrays and for receiving responsive second RFID transponder signals from each of the sensor-enabled RFID tags of the arrays.

The first RFID transceiver antenna, second RFID transceiver antenna and third RFID transceiver antenna are placed at know locations and distances relative to each other and to the sensor-enabled tags of the plurality so that triangulation can be applied to identify the point locations of each of the sensor-enabled tags in three-dimensional space of the reaction zone of the reactor.

It is preferred to position the RFID transceiver antennas within the reaction zone, since this eliminates the need for the interrogator signals and the transponder signals to pass through the wall of the reactor vessel. However, another embodiment of the inventive system is to position or place the RFID transceiver antennas external to the reactor vessel.

The RFID transceiver antennas are operatively connected to one or more readers that provide an interrogation signals to the RFID transceiver reader antennas and provide for receiving the RFID transponder signals transmitted by each of the sensor-enabled RFID tags of the plurality. Computer means provides for processing the information carried by each of the RFID transponder signals and for displaying or otherwise providing an output relating three-dimensional profile information about conditions throughout the reaction zone.

We now refer to FIG. 1, which is a schematic representation of an embodiment of inventive system 10 for wirelessly monitoring and profiling process conditions within reactor vessel 12. Reactor vessel 12 defines a reaction zone 14. Reaction zone 14 contains catalyst bed 16 filled with and comprising catalyst particles 18. Reactor vessel 12 is equipped with inlet nozzle 22 that is operatively connected to conduit 24. Inlet nozzle 22 provides means for fluid communication through conduit 24 and means for introducing a feed into reaction zone 14. Reactor vessel 12 is also equipped with outlet nozzle 26 operatively connected to conduit 28 and providing means for fluid communication through conduit 28 and means for removing an effluent from reaction zone 14.

FIG. 1 shows one embodiment of the inventive system 10 that includes first RFID transceiver antenna 32 and second RFID transceiver antenna 34 positioned within reaction zone 14. The RFID transceiver antennas are placed in three-dimensional space of reaction zone 14 at known locations and distances relative to each other.

While FIG. 1 shows that each of the RFID transceiver antennas is positioned within reaction zone 14, one or more RFID transceiver antennas may, alternatively, be placed at locations external to reactor vessel 12. It is important, however, to position the RFID transceiver antennas so that they are wirelessly linked to or coupled with each sensor-enabled RFID tag 40 of array 42 of sensor-enabled RFID tags 40. Array 42 is placed at a known height or level 44 within catalyst bed 16. Catalyst bed 16 can be characterized by its height 46 and width or diameter 48. Height 46 of catalyst bed 16 can be measured as the length between bottom 50 and surface 52 of catalyst bed 16.

We note that for illustration purposes a single array 42 of sensor-enabled RFID tags 40 is depicted in FIG. 1. However, the invention contemplates embodiments that include more than one array 42 of sensor-enabled RFID tags 40 that is placed at various known heights 44 within catalyst bed 16.

While first RFID reader antenna 32 is shown as located above surface 52 of catalyst bed 16, it is understood that first RFID reader antenna 32 may be placed anywhere within reaction zone 14, including within the boundary of and surrounded by catalyst particles of catalyst bed 16. This also applies for second RFID reader antenna 34, which is shown as located below catalyst bed 16. These RFID transceiver antennas may, as well, be placed anywhere within reaction zone 14, including within the boundary of and surrounded by catalyst particles of catalyst bed 16. As noted above, for each placement of a transceiver it should be wirelessly linked to each sensor-enabled RFID tag 40 of array 42.

Figure 2:
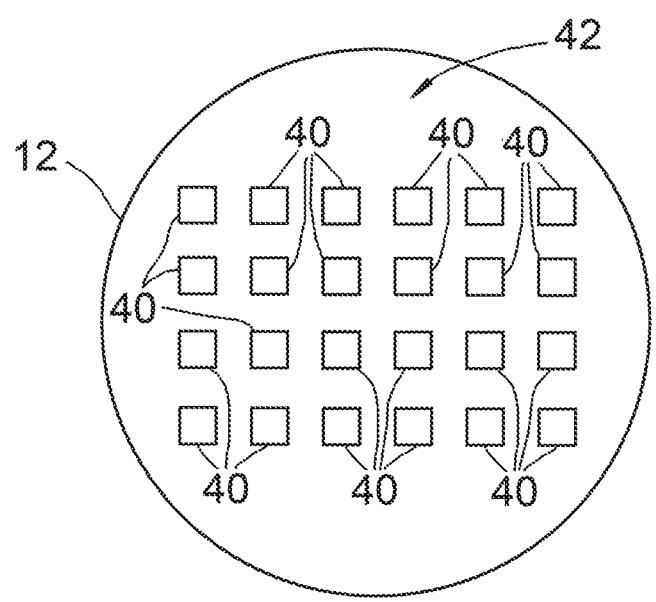
FIG. 2 is a plan view of cross-section A-A of the reactor vessel depicted in FIG. 1.

A plan view of cross section 2-2 is depicted in FIG. 2. The positions of each sensor-enabled RFID tag 40 are shown in FIG. 1 and FIG. 2, which illustrate how array 42 may be placed or disposed at known heights 44 throughout the height 46 of catalyst bed 16.

In the operation of inventive system 10, first RFID reader antenna 32 transmits first interrogation signal 54 to each sensor-enabled RFID tag 40 of array 42. This is depicted in FIG. 1 by an RF wave arrow symbol 54 extending from first RFID reader antenna 32 to one of the sensor-enabled RFID tags 40 of array 42. However, it is recognized that first interrogation signal 42 is a radio wave that is simultaneously transmitted to all the sensor-enabled RFID tags 40 of array 42 within catalyst bed 16.

Each sensor-enabled RFID tag 40 of array 42 receives first interrogation signal 54. In response to receiving first interrogation signal 54, each sensor-enabled RFID tag 40 respectively transmits its first associated RFID transponder signal 56 that includes information representative of the unique non-variable identification code encoded in the specific sensor-enabled RFID tag 40 and information representative of a variable reactor condition sensed or measured by and associated with the sensor-enabled RFID tag 40. The first associated RFID transponder signal 54 is received by first RFID transceiver antenna 32 and is processed by signal processing system 58.

FIG. 1 depicts the first associated RFID transponder signal 56 by an RF wave arrow symbol extending from a single sensor-enabled RFID tag 40 of array 42. It is understood that each of the sensor-enabled RFID tags 40 will transmit its own individual first associated RFID transponder signal 56 that carries a unique, non-variable identification code and variable sensor information representative of a variable reactor condition sensed or measured by and associated with the specific sensor-enabled RFID tag 40.

Second RFID transceiver antenna 34 is configured relative to the array 42 of sensor-enabled RFID tags 40 in a similar way as is first RFID transceiver antenna 32. Thus, second RFID reader antenna 34 transmits second interrogation signal 60 to each sensor-enabled RFID tag 40 of array 42. This is depicted by an RF wave arrow symbol extending from second RFID reader antenna 34 to one of the sensor-enabled RFID tags 40 of the array 42 of sensor-enabled RFID tags 40. It is noted, however, that second interrogation signal 60 is a radio wave that is simultaneously transmitted to all the sensor-enabled RFID tags 40 of the plurality distributed throughout catalyst bed 16.

Each sensor-enabled RFID tag 40 of the plurality receives second interrogation signal 60. In response to receiving second interrogation signal 60, each sensor-enabled RFID tag 40 respectively transmits its second associated RFID transponder signal 62 that includes information representative of the unique non-variable identification code encoded in the specific sensor-enabled RFID tag 40 and information representative of a variable reactor condition sensed or measured by and associated with the sensor-enabled RFID tag 40. The second associated RFID transponder signal 62 is received by second RFID transceiver antenna 34 and is processed by signal processing system 58.

First RFID transceiver antenna 32 and second RFID transceiver antenna 34 are operatively connected to signal processing system 58 respectively by cables 66 and 68. Signal processing system 58 provides means for providing interrogation signals to the RFID transceiver antennas and means for processing RFID transponder signals received by the RFID transceiver antennas.

Signal processing system 58 includes one or more readers 70 configured together with one or more computers 72 by cable 74, which provides means for communicating between readers 70 and computers 72. Computers 72 provide means for processing first RFID transponder signals 56 and second RFID transponder signals 62, and third RFID transponder signals 54 received respectively by first RFID transceiver antenna 32 and second RFID transceiver antenna 34. Computers 72 provide output information 76 relating to the measured environmental conditions throughout reaction zone 14 and three-dimensional profiles of the measured environmental conditions throughout reaction zone 14 for display or storage in memory or any other suitable format.

FIG. 2 presents a plan view of the cross-section A-A of reactor vessel 12 shown in FIG. 1. FIG. 2 illustrates how each array 42 of sensor-enabled RFID tags 40 might be placed at a known height 44 within reactor zone 14 of reactor vessel 12.

Figure 3:
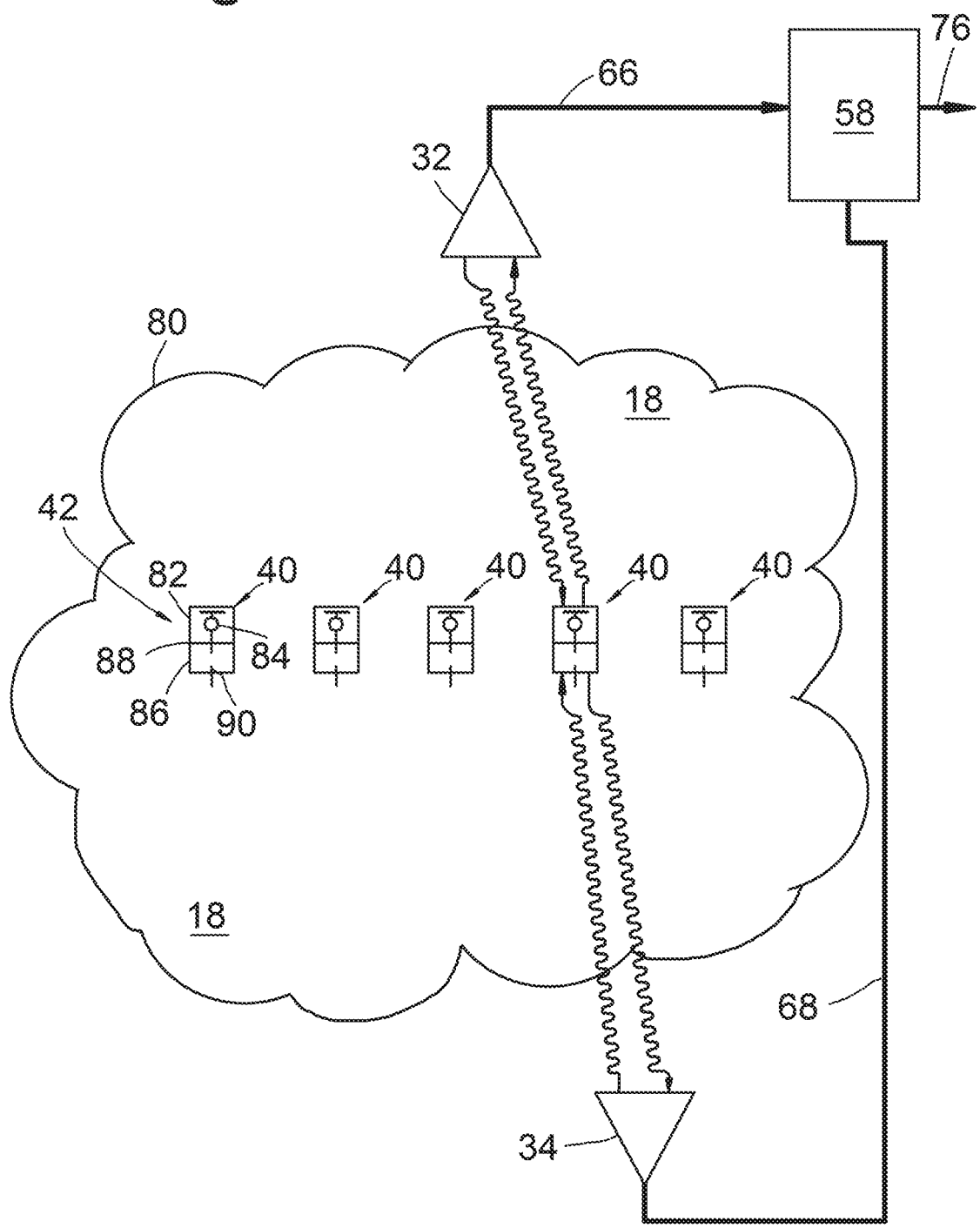
FIG. 3 is a diagram illustrating certain elements of the system for wireless reactor monitoring and profiling conditions within the reaction zone of a reactor.

FIG. 3 presents an enlarged detail that includes a single, representative array 42 of sensor-enabled RFID tags 40 surrounded by environment 80 of catalyst particles 18. FIG. 3 further shows a relationship with certain other elements of inventive system 10 that includes first RFID transceiver antenna 32, second RFID transceiver antenna 34 and signal processing system 58.

Each sensor-enabled RFID tag 40 comprises a passive RFID tag 82 that includes an integrated circuit 84. Integrated circuit 84 provides for the storage of a non-variable identification code associated with and representing the specific sensor-enabled RFID tag 40. Sensor-enabled RFID tag 40 further provides for the receipt of variable input information from sensor 86 that is representative of at least one condition of environment 80.

Sensor 86 is configured with passive RFID tag 82 and is operatively connected to passive RFID tag 82 by connection 88. Sensor 86 is capable of sensing or detecting a condition of environment 80 by use of element 90 or any other suitable sensing means capable of providing an analog or digital input to integrated circuit 84 that is representative of the environmental condition measured. Integrated circuit 84 provides for the modulation of RFID transponder signals 56 and 62 responsive to a sensor input signal provided via connection 88 so that RFID transponder signals 56 and 62 include or carry information that is representative of the measured condition within environment 80. Contained within environment 80 are catalyst particles 18.

Integrated circuit 84 is operatively connected to RFID tag antenna 92 providing means for transmitting RFID transponder signals 56 and 62 that carry, in addition to individual tag identification code information, variable input information from sensor 86 that is representative of at least one condition within environment 70 that surrounds or envelops the sensor-enabled RFID tags 40. RFID transponder signals 56 and 62 are transmitted in response to RFID tag antenna 92 receiving interrogation signals 54 and 60 respectively from first RFID transceiver antenna 32 and second RFID transceiver antenna 34.

That which is claimed is:

1. A system for measuring and profiling process conditions within a reactor vessel, wherein the system comprises:
the reactor vessel that defines a reaction zone, wherein within the reaction zone is a catalyst bed comprising catalyst particles, wherein the catalyst particles have particle sizes in the range of from 0.1 mm to 200 mm and comprise an inorganic oxide component and a metal component at a concentration in the range of from 0.1 to 30 wt. % based on metal, and the catalyst bed is characterized as having depth in the range of from 0.5 to 20 meters and a width in the range of from 0.5 to 20 meters;
an array of sensor-enabled RFID tags, wherein each sensor-enabled RFID tag of the array is placed at a known height within the catalyst bed and surrounded by a layer or envelope of the catalyst particles having a thickness of from about 0.5 to about 20 meters;
a first RFID reader (transceiver) antenna wirelessly linked to each sensor-enabled RFID tag of the array and that is configured to transmit a first interrogation signal and receive a first RFID transponder signal that is transmitted responsive to the first interrogation signal; and
a second RFID reader (transceiver) antenna wirelessly linked to each the sensor-enabled RFID tag of the array and that is configured to transmit a second interrogation signal and receive a second RFID transponder signal that is transmitted responsive to the second interrogation signal, wherein each sensor-enabled RFID tag of the array is encoded with a unique non-variable identification code, wherein each sensor-enabled RFID tag is configured to sense a reaction condition within the reaction zone, receive the first interrogation signal, the second interrogation signal, and, responsive to the first interrogation signal, transmit the first RFID transponder signal, and, responsive to the second interrogation signal, transmit the second RFID transponder signal, wherein the first RFID reader (transceiver) antenna is placed at a known location remote to the sensor-enabled RFID tags, wherein the second RFID reader (transceiver) antenna is placed at a known location remote to the sensor-enabled RFID tags, wherein the first RFID reader (transceiver) antenna and the second RFID reader (transceiver) antenna are located at known locations and distances relative to each other and to the sensor-enabled RFID tags so that triangulation methodology is applied to identify the point locations of each of the sensor-enabled RFID tag in the three-dimensional space of the reaction zone; and wherein each of the first and second RFID reader (transceiver) antennas is operatively connected to a signal processing system providing means for providing the first and second interrogation signals to the first and second RFID reader (transceiver) antennas and for receiving the first and second RFID transponder signals transmitted by each of the sensor-enabled RFID tags of the array; whereby conditions at specific locations and the known heights within the reaction zone are determined and profiled in three-dimensional space.

2. The system as recited in claim 1, wherein each sensor-enabled RFID tag of the array comprises an RFID tag operatively connected to sensor means for sensing an environmental or process condition and for providing a signal input to said RFID tag that is representative of the environmental or process condition.

3. The system as recited in claim 2, wherein one or more of the first and second RFID reader (transceiver) antennas are positioned within the reaction zone of the reactor vessel.

4. The system as recited in claim 3, where the reactor vessel includes inlet means providing fluid communication for introducing a feed stream into the reaction zone and outlet means providing fluid communication for removing an effluent stream from said reaction zone.

5. The system as recited in claim 4, wherein the reactor condition is selected from the group of environmental conditions consisting of pressure, temperature, chemical composition, vapor and liquid composition, density, flow rate, pH, vibration, radiation, magnetic flux, light intensity and sound intensity.

6. The system as recited in claim 2, wherein one or more of the first and second RFID reader (transceiver) antennas are positioned external to the reaction zone of the reactor vessel.

7. The system as recited in claim 6, where the reactor vessel includes inlet means providing fluid communication for introducing a feed stream into the reaction zone and outlet means providing fluid communication for removing an effluent stream from the reaction zone.

8. The system as recited claim 7, wherein the reactor condition is selected from the group of environmental conditions consisting of pressure, temperature, chemical composition, vapor and liquid composition, density, flow rate, pH, vibration, radiation, magnetic flux, light intensity and sound intensity.

9. A method of wirelessly monitoring and profiling process conditions within a reactor vessel, wherein the method comprises:

providing the reactor vessel that defines a reaction zone, wherein within the reaction zone is a catalyst bed comprising catalyst particles, wherein the catalyst particles have particle sizes in the range of from 0.1 mm to 200 mm and comprise an inorganic oxide component and a metal component at a concentration in the range of from 0.1 to 30 wt. % based on metal, and the catalyst bed is characterized as having a depth in the range of from 0.5 to 20 meters and a width in the range of from 0.5 to 20 meters, and an array of sensor-enabled RFID tags placed at known heights within the catalyst bed and surrounded by a layer or envelope of the catalyst particles having a thickness of from about 0.5 to about 20 meters, and wherein each of the sensor-enabled RFID tags of the array is encoded with a unique non-variable identification code and is further configured to measure a surrounding condition within the catalyst bed that is associated with the sensor-enabled RFID tag and to transmit, responsive to an interrogation signal, a responsive signal that includes information representative of the unique non-variable identification code and the surrounding condition associated therewith;

placing at a known location remote form the sensor-enabled RFID tags a first RFID reader (transceiver) antenna and transmitting by the first RFID reader (transceiver) antenna a first interrogation signal that is received by each of the sensor-enabled RFID tags, in response to receiving the first interrogation signal, each of the sensor-enabled RFID tags transmits its first associated RFID transponder signal received by the first RFID reader (transceiver) antenna that includes information representing its unique non-variable identification code and surrounding condition that is associated with the sensor-enabled RFID tag;

receiving by the first RFID reader (transceiver) antenna the first associated RFID transponder signals;

placing at a known location remote from the sensor-enabled RFID tags a second RFID reader (transceiver) antenna and transmitting by the second RFID reader (transceiver) antenna a second interrogation signal that is received by each of the sensor-enabled RFID tags, in response to receiving the second interrogation signal, each of the sensor-enabled RFID tags transmits its second associated RFID transponder signal received by the second RFID reader antenna (transceiver) that includes information representing its unique non-variable identification code and surrounding condition that is associated with the sensor-enabled RFID tag;

receiving by the second RFID reader (transceiver) antenna the second associated RFID transponder signals; and processing the first associated RFID transponder signals and the second associated RFID transponder signals;

applying triangulation to identify the point locations of each of the sensor-enabled RFID tag in the three dimensional space of the reaction zone, wherein each of the first and second RFID reader (transceiver) antennas are operatively connected to a signal processing system providing means for providing the first and second interrogation signals to the first and second RFID reader (transceiver) antennas and for receiving the first and second associated RFID transponder signals transmitted by each of the sensor-enabled RFID tags of the array, whereby conditions throughout the reaction zone are determined and profiled in three-dimensional space.

10. The method as recited in claim 9, wherein each of the sensor-enabled RFID tags of the array comprises an RFID tag operatively connected to sensor means for sensing an environmental or process condition and for providing a signal input to the RFID tag representative of the environmental or process condition.

11. The method as recited in claim 10, wherein one or more of the first and second RFID reader (transceiver) antennas is positioned within the reaction zone of the reactor vessel.

12. The method as recited in claim 11, where the reactor vessel includes inlet means providing fluid communication for introducing a feed stream into the reaction zone and outlet means providing fluid communication for removing an effluent stream from the reaction zone.

13. The method as recited in claim 12, wherein the reactor condition is selected from the group of environmental conditions consisting of pressure, temperature, chemical composition, vapor and liquid composition, density, flow rate, pH, vibration, radiation, magnetic flux, light intensity and sound intensity.

14. The method as recited in claim 9, wherein one or more of the first and second RFID reader (transceiver) antennas are positioned external to the reaction zone of the reactor vessel.

15. The method as recited in claim 14, where the reactor vessel includes inlet means providing fluid communication for introducing a feed stream into the reaction zone and outlet means providing fluid communication for removing an effluent stream from the reaction zone.

16. The method as recited in claim 15, wherein the reactor condition is selected from the group of environmental conditions consisting of pressure, temperature, chemical composition, vapor and liquid composition, density, flow rate, pH, vibration, radiation, magnetic flux, light intensity and sound intensity.

* * * * *